(12) United States Patent
Kuttel et al.

(10) Patent No.: US 9,634,599 B2
(45) Date of Patent: Apr. 25, 2017

(54) HIGH SPEED RATIO PERMANENT MAGNET MOTOR

(71) Applicant: CANRIG DRILLING TECHNOLOGY LTD, Houston, TX (US)

(72) Inventors: Beat Kuttel, The Woodlands, TX (US); Brian Ellis, Houston, TX (US)

(73) Assignee: Canrig Drilling Technology Ltd., Houston, TX (US)

( * ) Notice: Subject to any disclaimer, the term of this patent is extended or adjusted under 35 U.S.C. 154(b) by 0 days.

(21) Appl. No.: 14/980,193

(22) Filed: Dec. 28, 2015

(65) Prior Publication Data

US 2016/0197570 A1  Jul. 7, 2016

Related U.S. Application Data

(60) Provisional application No. 62/099,812, filed on Jan. 5, 2015.

(51) Int. Cl.
| | | |
|---|---|---|
| *H02P 27/00* | (2006.01) | |
| *H02P 23/00* | (2016.01) | |
| *H02P 6/08* | (2016.01) | |

(52) U.S. Cl.
CPC .............. *H02P 23/009* (2013.01); *H02P 6/08* (2013.01)

(58) Field of Classification Search
CPC .... H02P 6/00; H02P 6/14; H02P 21/00; H02P 23/12; H02P 29/06; H02P 6/18; H02P 27/04; H02P 23/00; H02P 25/00; H02P 27/00
USPC .... 318/400.01, 400.02, 400.14, 400.15, 700, 318/701, 721, 727, 779, 799, 800, 801, 318/430, 432, 437, 139, 268, 490, 599, 318/811; 363/21.1, 40, 44, 95, 120, 174, 363/175
See application file for complete search history.

(56) References Cited

U.S. PATENT DOCUMENTS

| | | |
|---|---|---|
| 2,709,284 A | 5/1955 | Evans et al. |
| 3,231,803 A | 1/1966 | Pryor et al. |
| 3,653,636 A | 4/1972 | Burrell |
| 4,046,355 A | 9/1977 | Martin |
| 4,226,311 A | 10/1980 | Johnson et al. |
| 4,242,057 A | 12/1980 | Bender |
| 4,284,253 A | 8/1981 | Uribe |
| 4,314,692 A | 2/1982 | Brauer et al. |
| 4,438,904 A | 3/1984 | White |
| 4,527,959 A | 7/1985 | Whiteman |
| 4,545,017 A | 10/1985 | Richardson |

(Continued)

FOREIGN PATENT DOCUMENTS

| | | |
|---|---|---|
| WO | 8908941 A1 | 9/1989 |
| WO | 00/76054 A1 | 12/2000 |
| WO | 2005021927 A1 | 3/2005 |

OTHER PUBLICATIONS

Office Action issued in U.S. Appl. No. 12/629,354 mailed Dec. 19, 2011 (11 pages).

(Continued)

*Primary Examiner* — Antony M Paul
(74) *Attorney, Agent, or Firm* — Adolph Locklar

(57) ABSTRACT

A permanent magnet motor having a high speed ratio may remove the need for a gearbox or multiple windings in the permanent magnet motor. A gearbox or a multiple-winding configuration stator may thus be omitted.

20 Claims, 2 Drawing Sheets

(56) References Cited

U.S. PATENT DOCUMENTS

| | | | |
|---|---|---|---|
| 4,545,567 A | 10/1985 | Telford et al. | |
| 4,910,790 A | 3/1990 | Kerashaw | |
| 5,146,433 A | 9/1992 | Kosmala et al. | |
| 5,259,731 A | 11/1993 | Dhindsa et al. | |
| 5,306,124 A | 4/1994 | Back | |
| 5,331,238 A | 7/1994 | Johnsen | |
| 5,351,767 A | 10/1994 | Stogner et al. | |
| 5,375,098 A | 12/1994 | Malone et al. | |
| 5,616,009 A | 4/1997 | Birdwell | |
| 5,952,757 A | 9/1999 | Boyd, Jr. | |
| 6,029,951 A | 2/2000 | Guggari | |
| 6,094,024 A | 7/2000 | Westlake | |
| 6,182,945 B1 | 2/2001 | Dryer et al. | |
| 6,419,465 B1 | 7/2002 | Goettel et al. | |
| 6,577,483 B1 | 6/2003 | Steicher et al. | |
| 6,995,682 B1 | 2/2006 | Chen et al. | |
| 7,462,138 B2 | 12/2008 | Shetty et al. | |
| 7,549,467 B2 | 6/2009 | McDonald et al. | |
| 7,633,248 B1 | 12/2009 | Williams | |
| 7,737,592 B2 | 6/2010 | Makino et al. | |
| 7,851,962 B1 | 12/2010 | Williams | |
| 8,368,276 B2 | 2/2013 | Wolf et al. | |
| 8,390,232 B2 * | 3/2013 | Kauppi | H02K 21/028 318/538 |
| 2002/0121823 A1 | 9/2002 | Gauthier | |
| 2004/0251766 A1 | 12/2004 | Komentani et al. | |
| 2004/0256110 A1 | 12/2004 | York et al. | |
| 2005/0206266 A1 | 9/2005 | Hans | |
| 2006/0017339 A1 | 1/2006 | Chordia et al. | |
| 2006/0049712 A1 | 3/2006 | Zepp et al. | |
| 2006/0108881 A1 | 5/2006 | Hauger et al. | |
| 2006/0108890 A1 | 5/2006 | Hauger et al. | |
| 2006/0119197 A1 | 6/2006 | Puterbaugh et al. | |
| 2006/0133905 A1 | 6/2006 | Woodruff | |
| 2006/0175064 A1 | 8/2006 | Yuratich | |
| 2006/0181238 A1 | 8/2006 | Choi et al. | |
| 2007/0053780 A1 | 3/2007 | Ruffner et al. | |
| 2007/0114856 A1 | 5/2007 | Park | |
| 2007/0228862 A1 | 10/2007 | Welchko et al. | |
| 2007/0241627 A1 | 10/2007 | Kharsa | |
| 2007/0267222 A1 | 11/2007 | Howard, Jr. et al. | |
| 2008/0061645 A1 | 3/2008 | Yukitake | |
| 2008/0116432 A1 | 5/2008 | Folk et al. | |
| 2008/0181798 A1 | 7/2008 | Folk et al. | |
| 2008/0203734 A1 | 8/2008 | Grimes et al. | |
| 2008/0265813 A1 | 10/2008 | Eschleman et al. | |
| 2008/0267785 A1 | 10/2008 | Cervenka et al. | |
| 2009/0267440 A1 | 10/2009 | Komentani et al. | |
| 2011/0295269 A1 | 12/2011 | Swensgard et al. | |
| 2011/0309315 A1 | 12/2011 | Williams | |

OTHER PUBLICATIONS

Office Action issued in U.S. Appl. No. 12/629,354 mailed Dec. 31, 2012 (11 pages).
Office Action issued in U.S. Appl. No. 12/629,354 mailed Apr. 11, 2012 (11 pages).
Office Action issued in U.S. Appl. No. 12/876,673 mailed Apr. 5, 2013 (12 pages).
Office Action issued in U.S. Appl. No. 12/876,673 mailed Oct. 24, 2012 (14 pages).
Office Action issued in U.S. Appl. No. 12/643,439, mailed Aug. 7, 2012 (21 pages).
Office Action issued in U.S. Appl. No. 12/643,439, mailed Feb. 10, 2012 (20 pages).
Office Action issued in U.S. Appl. No. 13/126,319, mailed Mar. 27, 2013 (5 pages).
Machine translation of WO8908941 publication date Sep. 21, 1989 (2 pages).
International Preliminary Report on Patentability and Written Opinion issued in International Patent Application No. PCT/US2010/060943, mailed Jul. 5, 2012 (8 pages).
For the American Heritage Dictionary definition: connected. (n.d.) The American Heritage Dictionary of the English Language, Fourth Edition. (2003). Retrieved Apr. 29, 2013 from http://www.thefreedictionary.com/connected.
For the American Heritage Dictionary definition: receiving. (n.d.) The American Heritage Dictionary of the English Language, Fourth Edition. (2003). Retrieved Apr. 30, 2013 from http://www.thefreedictionary.com/receiving.
For the American Heritage Dictionary definition: directly. (n.d.) The American Heritage Dictionary of the English Language, Fourth Edition. (2003). Retrieved Apr. 29, 2013 from http://www.thefreedictionary.com/directly.

* cited by examiner

HIGH SPEED RATIO PERMANENT MAGNET MOTOR

CROSS-REFERENCE TO RELATED APPLICATIONS

This application is a nonprovisional application which claims priority from U.S. provisional application No. 62/099,812, filed Jan. 5, 2015.

TECHNICAL FIELD/FIELD OF THE DISCLOSURE

The present disclosure relates generally to electric motors, and specifically to AC permanent magnet electric motors.

BACKGROUND OF THE DISCLOSURE

Alternating current (AC) electric motors rely on alternating currents passed through induction windings within the stator to cause rotation of the rotor. So-called three phase AC motors include three matched sets of windings positioned radially about the stator. By supplying sinusoidal AC power to each of the sets of windings such that each set receives an alternating current offset by 120 degrees, a largely continuous torque can be imparted on the rotor as it rotates.

Unlike a brushed DC motor, output speed in an AC motor is controlled by the frequency of the current sent to the stator windings. In order to control output torque, and thus speed, a variable frequency drive (VFD) may be used to vary the current fed to the AC motor. Because the inductive reactance of the stator windings is proportional to the frequency applied to the windings, increased voltage is necessary to maintain a relatively constant current within the windings, and thus a relatively constant output torque up to the motor's rated speed. The rated speed generally corresponds with the rated voltage (usually equal to the supply voltage of the VFD). Past the rated speed, the speed of the AC motor may be increased through field weakening as discussed hereinbelow. This control algorithm is typically referred to as volts/Hz or V/Hz control.

In some electric motors, both the rotor and stator include coils. In such an induction motor, the magnetic field induced by the stator coils induces current within the rotor coils which, due to Lenz's law, causes a resultant torque on the rotor, thus causing rotation.

In a permanent magnet motor, on the other hand, the rotor includes one or more permanent magnets. The permanent magnets, in attempting to align with the magnetic field induced by the coils in the stator, cause a resultant torque on the rotor. By varying the orientation of the magnetic field, the rotor may thus be caused to rotate. In high-torque permanent magnet motors, such as for an internal rotor permanent magnet motor, multiple permanent magnets may be positioned on the exterior of the rotor.

VFDs typically use one of two control methods. In a Volts/Hz control scheme, the VFD varies the output speed of the motor by supplying AC power to the stator windings at a particular frequency and voltage. For a given desired torque, voltage is proportionally related to the frequency by a so-called "voltage-to-frequency" or "volts/Hz" ratio. As understood in the art, the impedance of an electric motor includes a static impedance and a back-EMF or counter-EMF. The static impedance is determined by the winding arrangement and construction of the motor. The counter-EMF is created by, in a permanent magnet motor, the current induced in the motor windings by the rotating magnetic fields of the permanent magnets. Accordingly, counter-EMF is negligible when the motor is at a standstill. As the speed of the motor increases, the counter-EMF likewise increases requiring additional drive voltage to be applied to the motor in order to maintain sufficient current through the windings of the motor. Traditionally, the drive voltage is supplied by the volts/Hz ratio, which is typically a constant through the normal operating range. Throughout this normal operation range, current is maintained in phase with the rotor. At a certain speed, the counter-EMF voltage reaches or exceeds the output voltage capability of the motor driver, at which point the phase of the current supplied to the motor is modified in order to, in a permanent magnet motor, inject negative polarity flux into the permanent magnets, effectively reducing their magnetic fields and thus the counter-EMF. By using closed-loop feedback, a VFD using volts/Hz can maintain motor speed in changing conditions. This simple form of volts/Hz may not allow accurate torque control.

With the rapid advancement in low-cost, high speed microprocessor technology, VFDs utilizing so-called vector control or field-oriented control (FOC) models have been used. In FOC, the current supplied to the phases of the AC motor is decoupled into torque and flux components acting on the rotor in a rotating reference frame. Thus, each of these components may be independently controlled. Current supplied to the phases of the motor are measured or derived and transformed into the torque-flux space (utilizing, for example, a Clarke/Park transformation), a closed-loop feedback model can be created to control each of these components continuously. The processor then back-transforms the torque and flux components into three phase currents. The three phase currents are fed to a three phase inverter which outputs pulse-width modulated signals to each set of windings in the motor.

In any AC motor, even under FOC, as the speed of the permanent magnet motor is increased, the voltage generated by the fixed magnetic field (EMF) increases proportionally. At a certain speed, the voltage generated by the motor exceeds the maximum voltage that can be produced by the drive that is controlling the motor. If operation above this speed is desired, it is necessary to modify the current vector applied to the motor to maintain the desired torque, and control the terminal voltage of the motor to a value less than the maximum drive output voltage. Control in this speed range is known as "field weakening control." As the speed of the motor increases, the torque available decreases when in field weakening. At some speed, the available torque will not be enough to sustain operation of the motor. The ratio between this maximum speed and the rated or base speed of the motor is known as a speed ratio. Typically a permanent magnet motor may achieve a 3:1 speed ratio, an induction motor may achieve a 5:1 ratio, but typical electric motors may achieve between a 2:1 and 3:1 speed ratio.

SUMMARY

The present disclosure provides for a method for operating a piece of equipment driven by rotary power. The method may include coupling a permanent magnet AC motor to a shaft of the piece of equipment. The shaft may be adapted to be rotated directly by the permanent magnet AC motor. The permanent magnet AC motor may include a stator and a rotor. The rotor may include a permanent magnet positioned thereon. The method may include supplying alternating current to the stator. The method may include rotating the shaft. The method may include injecting a direct current in the opposite direction of a magnetic flux created by the permanent magnet and weakening the magnetic field of the permanent magnet. The method may include increasing the speed of the permanent magnet AC motor to a maximum speed based on a speed ratio of the permanent magnet AC motor, the speed ratio defined as the ratio between the maximum speed and a rated speed, the rated speed corresponding to a rated voltage of the permanent magnet AC motor.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
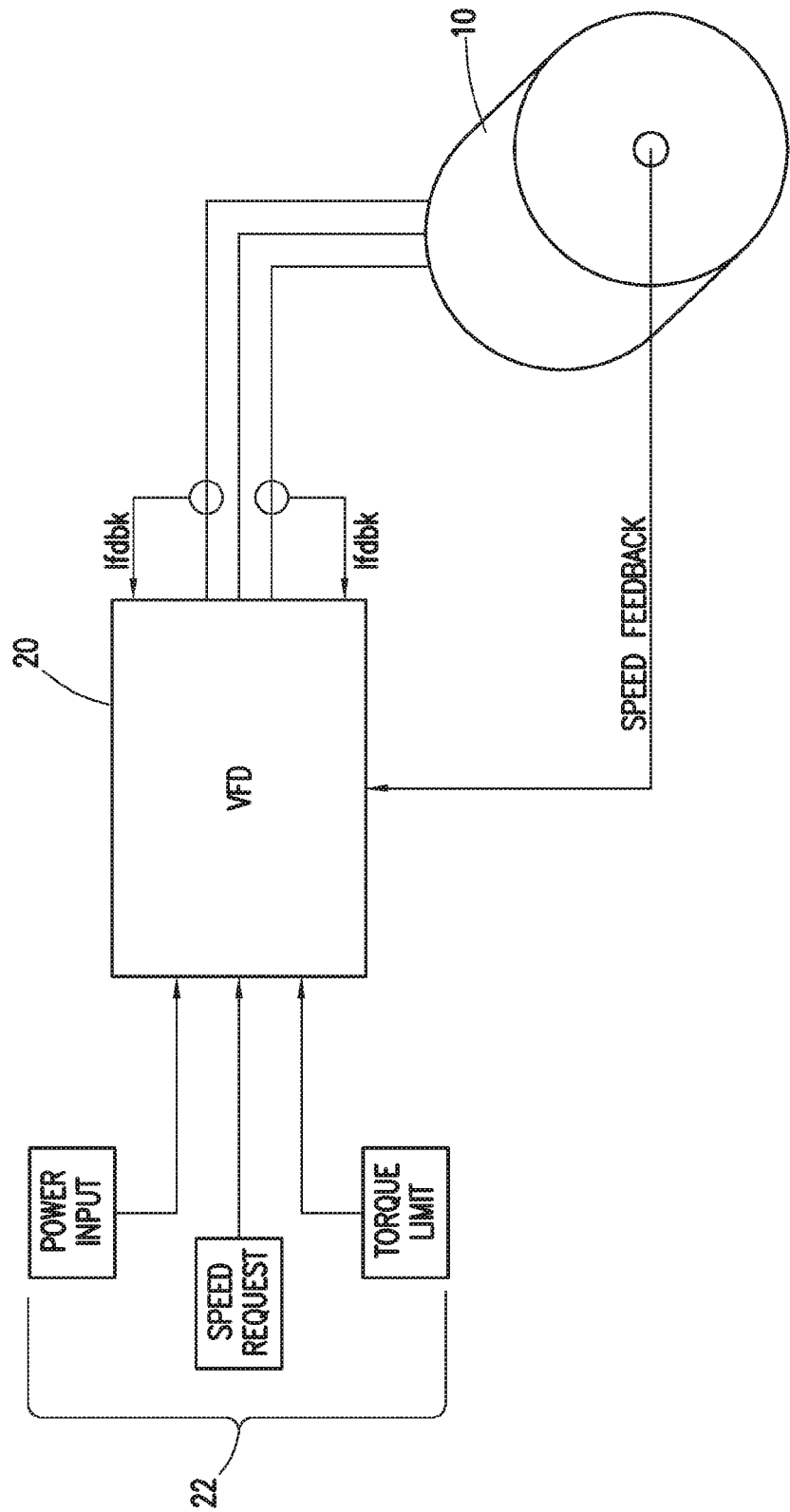
FIG. 1 depicts a block diagram of a three phase permanent magnet AC motor controlled by a VFD.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a block diagram of three phase AC motor 10 controlled by VFD 20. VFD 20 may be positioned to output three phase AC power to the stator windings (not shown) of AC motor 10 in response to input parameters 22. Input parameters 22 are at least one of torque demand, speed demand, and maximum drive voltage.

In the case of a permanent magnet motor, the interaction of current, flux, voltage, and speed may be defined by the model voltage equation as follows:

$$\underline{v}_s = R_s \cdot \underline{i}_s + l_s \dot{\underline{i}}_s + j\omega_0 l_s \cdot \underline{i}_s + \dot{\underline{\phi}}_r + j\omega_0 \underline{\phi}_r,$$

where $\underline{v}_s$ is the stator voltage vector, $R_s$ is the stator resistance, $\underline{i}_s$ is the stator current vector, $l_s$ is the stator leakage inductance, $\underline{\phi}_r$ is the total rotor flux vector, and $\omega_0$ is the synchronous frequency given by:

$$\omega = P_p \times \omega_r,$$

where $P_p$ is the number of pole pairs per phase, and $\omega_r$ is the speed of the rotor. Total rotor flux $\underline{\phi}_r$ may be given by:

$$\underline{\phi}_r = \underline{\phi}_{pm} + L_m \cdot \underline{i}_s,$$

where $\underline{\phi}_{pm}$ is the permanent magnet flux (the reference frame is chosen such that the permanent magnet flux is entirely real), and $\underline{L}_m$ is the mutual stator-rotor inductance. As used in the equations, "_" indicates a vector quantity, and the "·" operator is the first order time derivative.

Substituting the flux equation into the voltage equation, and the definition that $\underline{\phi}_m$ is entirely real (direct or d-axis), the voltage equation evaluates to:

$$\begin{bmatrix} v_d \\ v_q \end{bmatrix} = \begin{bmatrix} R_s + pL_d & -\omega_0 L_q \\ \omega_0 L_d & R_s + pL_q \end{bmatrix} \begin{bmatrix} i_d \\ i_q \end{bmatrix} + \begin{bmatrix} 0 \\ \omega_0 \Phi_m \end{bmatrix},$$

where p is the d/dt operator, $L_d$ is the total inductance in the d-axis, $L_q$ is the total inductance in the quadrature or q-axis, each given by:

$$L_d = (l_s + L_{dm})$$

$$L_q = (l_s + L_{qm}),$$

where $L_{dm}$ is the d-axis component of $\underline{L}_m$ and $L_{qm}$ is the q-axis component of $\underline{L}_m$.

Torque supplied by the motor may be described by:

$$T_e = 3P_p(\underline{\phi}_r \times \underline{i}_s),$$

which, from the definition that $\underline{\phi}_m$ is entirely real, can be expressed as:

$$T_e = 3P_p(\phi_m \cdot i_q + (\underline{L}_d - \underline{L}_q) i_d \cdot i_q).$$

Thus, speed can be expressed by the following equation:

$$\dot{\omega}_r = \frac{1}{(J_m + J_L)} (T_e - T_m(\omega_r) - T_L(\omega_r)),$$

where $J_m$ and $J_L$ are the motor and load inertias respectively, $T_m(\omega_r)$ is the motor loss torque as a function of speed, and $T_L(\omega_r)$ is the load torque as a function of speed.

The voltage and flux equations can thus be combined into the following extended state-space format:

$$\begin{bmatrix} \dot{i}_d \\ \dot{i}_q \end{bmatrix} = \begin{bmatrix} \left(\frac{-R_s}{L_d}\right) & \left(\omega_0 \frac{L_q}{L_d}\right) \\ \left(-\omega_0 \frac{L_d}{L_q}\right) & \left(\frac{-R_s}{L_q}\right) \end{bmatrix} \begin{bmatrix} i_d \\ i_q \end{bmatrix} + \begin{bmatrix} \left(\frac{V_d}{L_d}\right) \\ \left(\frac{V_q - \omega_0 \phi_m}{L_q}\right) \end{bmatrix}.$$

Figure 2:
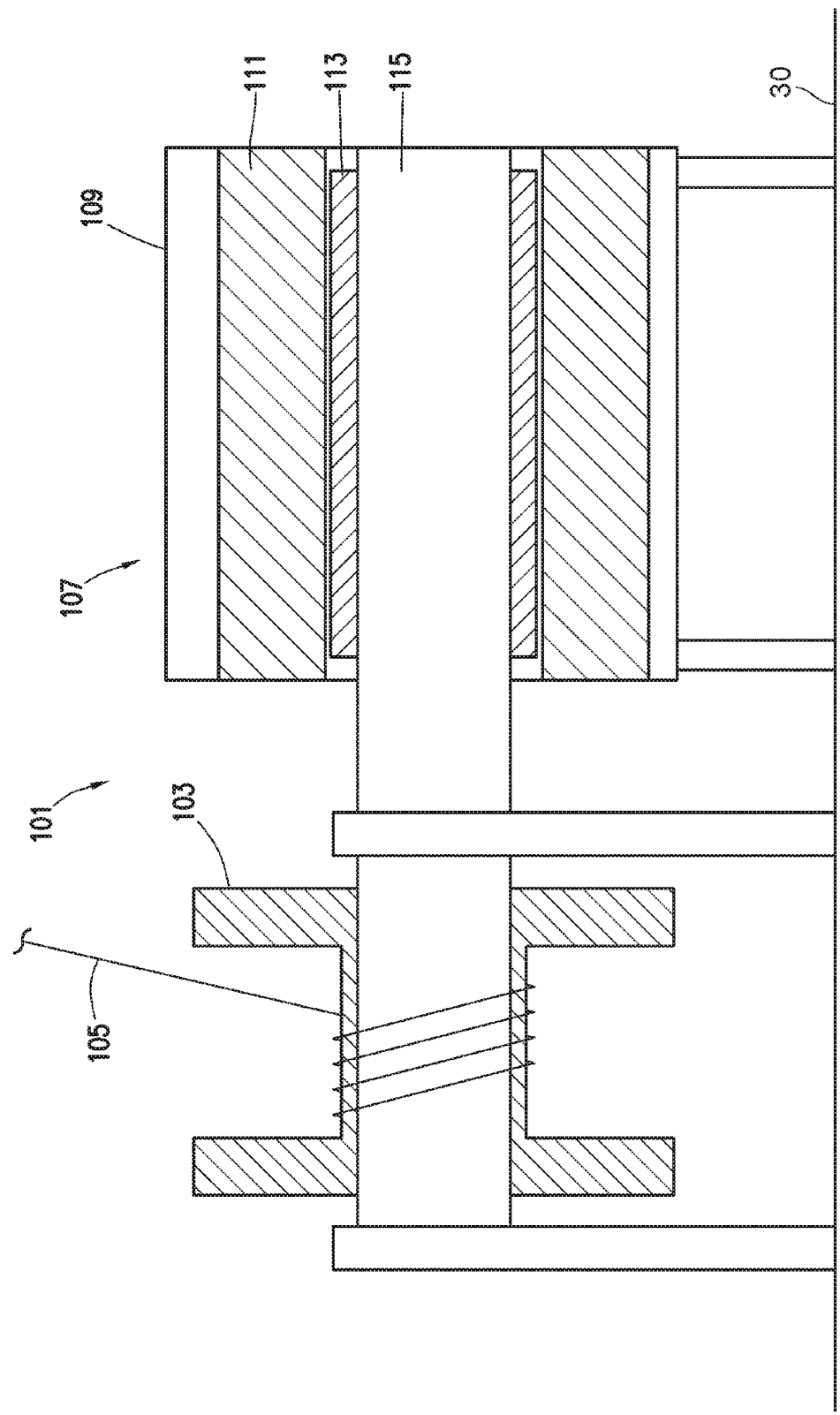
FIG. 2 depicts a cross section view of a permanent magnet AC motor consistent with embodiments of the present disclosure.

In some embodiments of the present disclosure, AC motor 10 may be a permanent magnet motor used to power another piece of equipment through rotary power provided by the output shaft of the motor. For example and without limitation, FIG. 2 depicts drawworks 101. One having ordinary skill in the art with the benefit of this disclosure will understand that drawworks 101 may be replaced by any other piece of equipment driven by rotary power.

Drawworks 101 is positioned on surface 30. In some embodiments, surface 30 may be, for example and without limitation, the deck of a drilling rig for which drawworks 101 is being used. In other embodiments, surface 30 may be an undercarriage, frame, or skid upon which drawworks 101 is positioned.

Drawworks 101 may include drum 103. Drum 103 may be adapted to have hoisting line 105 wrapped therearound and, as drum 103 is rotated, heave in or pay out hoisting line 105 depending on the direction of rotation of drum 103.

In some embodiments, drawworks 101 may include one or more electric motors. In some embodiments as depicted in FIGS. 1, 2, a single electric motor 107 may be coupled to drum 103. In some embodiments, drawworks 101 may include one or more electric motors positioned on each end of drum 103. In some embodiments, electric motor 107 may include motor housing 109, stator 111, and rotor 113. As understood in the art with the benefit of this disclosure, rotor 113 and stator 111 may be located within motor housing 109.

In some embodiments, as depicted in FIG. 2, rotor 113 may be positioned within stator 111, i.e. an interior rotor electric motor. Stator 111 may be fixed to the inner wall of motor housing 109. Stator 111 may extend around the cylindrical interior of motor housing 109. Stator 111 may include coils of wire positioned around the inner surface of stator 111. The coils of stator 111 are positioned to, when AC power is supplied thereto, induce a continuously rotating electromagnetic field into the interior thereof. In some embodiments, in which electric motor 107 is a permanent magnet motor, the electromagnetic field may interact with the permanent magnet field of permanent magnets included in rotor 113, thus rotating rotor 113.

In other embodiments, not shown, one having ordinary skill in the art with the benefit of this disclosure will understand that rotor 113 may be positioned outside of stator 111, an exterior rotor electric motor. The coils may thus be positioned on an exterior surface of stator 111. In some such embodiments, rotor 113 may be formed as part of drum 103 which is positioned about stator 111.

Rotor 113 may be coupled to shaft 115. In some embodiments, as depicted in FIG. 2, rotor 113 may be a generally tubular member, with shaft 115 extending at least partially into the interior thereof. In some embodiments, as depicted in FIG. 2, shaft 115 may couple both to rotor 113 and to drum 103. In other embodiments, shaft 115 may be made up of multiple shaft components. For example shaft 115 may include a motor shaft coupled to a drum shaft by a rigid coupler such as, for example and without limitation, a flange coupler. The flange coupler may, as understood in the art, be adapted to join the motor shaft and the drum shaft into a single, continuous shaft 115 adapted to be rotated by rotor 113 as it is rotated by electric motor 107, and thus rotate drum 103.

In some embodiments, electric motor 107 may be configured such that, in the field weakening regime, electric motor 107 may achieve a speed ratio of between 2:1 and 20:1. In some embodiments, electric motor 107 may achieve a speed ratio of between 6:1 and 15:1. In some embodiments, electric motor 107 may achieve a speed ratio of between 8:1 and 12:1. In some embodiments, electric motor 107 may achieve a speed ratio of generally 10:1. In some embodiments, the arrangement of the components of electric motor 107 may be modified by varying the arrangement of the permanent magnets, varying the distance between rotor 113 and stator 111 ("air gap"), modifying the winding arrangement of stator 111, or combinations thereof. Because field weakening on PM motors is achieved by injecting a direct current (DC) in the opposite direction of the magnetic flux created by the permanent magnets to counteract (weaken) the permanent magnetic field, modification of the air gap, arrangement of permanent magnets, or winding arrangements may permit a higher DC to be injected. Thus, more of the permanent magnetic field is weakened, allowing a reduced counter-EMF. Thus, less voltage is required to maintain adequate potential difference to drive AC current through the stator windings, and thereby extending the speed range.

By utilizing an electric motor 107 with a high speed ratio, additional components such as gearboxes between the motor and the driven equipment may not be necessary. Additionally, electric motor 107 may be operated without including reconfigurable or multiple winding sets in stator 111. For example, as understood in the art, a three phase motor may have windings arranged in a Wye or delta configuration. Additionally, windings at each pole in each of the phases may be connected in parallel or in series. In some motors, complicated switching apparatuses or multiple winding sets are used to allow the motor to be reconfigured. In embodiments of the present disclosure, such switching may be unnecessary due to the ability of electric motor 107 to operate with a high speed ratio achieved by an extended field weakening range. The ability to omit multiple winding sets, switching apparatuses, and gearboxes may, for example and without limitation, reduce weight, cost, and complexity of electric motor 107 and the equipment in which it is installed. Additionally, when used in adverse conditions, such as in the presence of flammable or explosive gases or liquids, the lack of electric switching equipment may increase the safety of the apparatus.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method for operating a piece of equipment driven by rotary power comprising:
coupling a permanent magnet AC motor to a shaft of the piece of equipment, the shaft adapted to be rotated directly by the permanent magnet AC motor, the permanent magnet AC motor including a stator and a rotor, the rotor having a permanent magnet positioned thereon;
supplying alternating current to the stator;
rotating the shaft;
injecting a direct current in the opposite direction of a magnetic flux created by the permanent magnet and weakening the magnetic field of the permanent magnet; and
increasing the speed of the permanent magnet AC motor to a maximum speed based on a speed ratio of the permanent magnet AC motor, the speed ratio defined as the ratio between the maximum speed and a rated speed, the rated speed corresponding to a rated voltage of the permanent magnet AC motor.

2. The method of claim 1, wherein the speed ratio is between 2:1 and 20:1.

3. The method of claim 1, wherein the speed ratio is between 6:1 and 15:1.

4. The method of claim 1, wherein the speed ratio is between 8:1 and 12:1.

5. The method of claim 1, wherein the speed ratio is generally 10:1.

6. The method of claim 1, wherein the permanent magnet AC motor comprises a stator having one or more windings; and a rotor, the rotor having one or more permanent magnets fixed thereto and adapted to rotate in response to a rotating electric field induced by the windings of the stator.

7. The method of claim 6, wherein the distance between the rotor and the stator defines an air gap, the arrangement of the permanent magnet motors in the rotor defines a permanent magnet arrangement, and the arrangement of the windings of the stator defines a winding arrangement.

8. The method of claim 7, wherein the speed ratio of the permanent magnet AC motor is determined by varying one or more of the air gap, the permanent magnet arrangement, or the winding arrangement.

9. The method of claim 6, wherein the piece of equipment is a drawworks including a winch, the winch being coupled to the permanent magnet AC motor by the shaft coupled to the rotor.

10. The method of claim 9, wherein the winch is coupled directly to the permanent magnet AC motor with no gear box therebetween.

11. The method of claim 6, wherein the windings of the stator are coupled to a motor driver, the motor driver adapted to provide current to each phase of the windings of the stator.

12. The method of claim 11, wherein the interconnection between the motor driver and the stator windings is not reconfigured.

13. The method of claim 6, wherein the stator comprises a single set of windings.

14. The method of claim 1, wherein the piece of equipment is a drawworks, top drive, or mud pump.

15. The method of claim 14, wherein the shaft comprises multiple shaft components.

16. The method of claim 15, wherein the shaft comprises a rigid coupler.

17. The method of claim 14, wherein the piece of equipment is a drawworks, the drawworks including a drum coupled to the shaft.

18. The method of claim 17, further comprising coupling a second permanent magnet AC motor to the drum.

19. The method of claim 18 wherein the permanent magnet AC motors are positioned on either end of the drum.

20. The method of claim 1, wherein the alternating current and direct current are supplied to the permanent magnet AC motor by a variable frequency drive.

* * * * *